United States Patent
Jalili

(10) Patent No.: US 9,696,741 B2
(45) Date of Patent: Jul. 4, 2017

(54) METHOD AND DEVICE FOR FEEDING ELECTRICAL POWER INTO AN ELECTRICAL POWER SUPPLY NETWORK

(71) Applicant: GE ENERGY POWER CONVERSION TECHNOLOGY LIMITED, Rugby, Warwickshire (GB)

(72) Inventor: Kamran Jalili, Berlin (DE)

(73) Assignee: GE ENERGY POWER CONVERSION TECHNOLOGY LIMITED, Rugby, Warwickshire (GB)

( * ) Notice: Subject to any disclaimer, the term of this patent is extended or adjusted under 35 U.S.C. 154(b) by 1013 days.

(21) Appl. No.: 13/920,566

(22) Filed: Jun. 18, 2013

(65) Prior Publication Data
US 2014/0021804 A1    Jan. 23, 2014

(30) Foreign Application Priority Data

Jun. 18, 2012  (DE) ................. 10 2012 210 207

(51) Int. Cl.
  G05F 1/67  (2006.01)
  G05F 1/70  (2006.01)
  H02J 3/38  (2006.01)

(52) U.S. Cl.
  CPC .......... *G05F 1/67* (2013.01); *G05F 1/70* (2013.01); *H02J 3/385* (2013.01); *Y02E 10/58* (2013.01)

(58) Field of Classification Search
  CPC .................. H02J 3/385; G05F 1/70
  See application file for complete search history.

(56) References Cited

U.S. PATENT DOCUMENTS 6,984,970 B2 *   1/2006   Capel ................. G05F 1/67
                                                323/299
7,465,872 B1 *  12/2008   de Rooij ............. H02J 3/01
                                                136/243

(Continued)

FOREIGN PATENT DOCUMENTS

DE    199 61 704 A1    7/2001
DE      19961705 A1 *  7/2001   ............. H02J 3/38
DE    2011 053 094 A1  3/2012

OTHER PUBLICATIONS

Germany Patent Office Search Report, Apr. 25, 2013.

*Primary Examiner* — Thienvu Tran
*Assistant Examiner* — Pinping Sun
(74) *Attorney, Agent, or Firm* — GE Global Patent Operation; Scott R. Stanley

(57) ABSTRACT

A method for feeding electrical power into an electrical power supply network is described. A configuration for supplying electrical power in the form of DC voltage has been provided and it is connected to the power supply network through an inverter. An MPP tracker (31) has been provided for influencing the inverter, from which an intermediate circuit desired voltage ($u_{dc,\ ref}$) is determined. A modulation regulator (33) has been provided, from which a given reactive power desired value ($Q_{ref}$) is changed to a reactive power value ($Q^*$). The inverter (17) is influenced by the intermediate circuit desired value ($u_{dc,\ ref}$) and the reactive power value ($Q^*$).

11 Claims, 3 Drawing Sheets

(56) References Cited

U.S. PATENT DOCUMENTS

| | | | | |
|---|---|---|---|---|
| 8,159,178 B2* | 4/2012 | Serban | ...................... | G05F 1/67 |
| | | | | 320/101 |
| 2008/0239770 A1 | 10/2008 | Punzet et al. | | |
| 2010/0309695 A1* | 12/2010 | Fornage | .................... | G05F 1/67 |
| | | | | 363/95 |
| 2011/0273022 A1* | 11/2011 | Dennis | ...................... | H02J 1/10 |
| | | | | 307/72 |
| 2012/0075898 A1* | 3/2012 | Sigamani | .................. | G05F 1/67 |
| | | | | 363/131 |

\* cited by examiner

METHOD AND DEVICE FOR FEEDING ELECTRICAL POWER INTO AN ELECTRICAL POWER SUPPLY NETWORK

The invention refers to a method and device for feeding electrical power into an electrical power supply network.

A solar installation is known from DE 10 2011 053 094 A1 in which a photovoltaic generator is coupled to an electrical power supply network by means of an inverter. In order to extract the largest possible output from the solar installation, a so-called MPP tracker (MPP=maximum power point) is used, which is a method especially suitable for controlling the inverter of a solar installation.

The task of the present invention is to improve the known device and the method applied therein.

The invention solves this task by the claimed methods and devices.

The method according to the invention is a configuration for delivering electrical power in the form of direct current (DC) voltage through an inverter using an electrical power supply network. There is an MPP tracker for influencing the inverter, from which an intermediate circuit desired voltage is determined. A modulating control system is provided from which a preset reactive power desired value is changed to a reactive power value. The inverter is influenced by the intermediate circuit desired voltage and the reactive power value.

Using the MPP tracker, the largest possible output can be obtained. At the same time, the modulation control system allows the entire method to have a largely linear behavior. A linear behavior occurs especially when the relationship between a line voltage of the electrical power supply network and an intermediate circuit voltage of the inverter is between 0 and 1.

In a configuration of the invention, the method is implemented when an active power that was fed into the electrical power supply network is greater than a given value. In this case, the method according to the invention always allows the extraction of the largest possible output with a linear modulation.

The given value mentioned above is rather small, in particular only very slightly above zero. Preferably, the value can have the magnitude of about 1% of the active power fed into the electrical power supply network. Alternatively, the value can be determined depending on power dissipation.

In another configuration of the invention, when the active power fed into the electrical power supply network is smaller than or equal to the given value, a given lower voltage is changed to an intermediate circuit desired value and the inverter is influenced by the intermediate circuit desired value and a given reactive power desired value. Thus, in this case, the inverter's influence is changed and consequently adjusted to the existing, rather small active power.

In a further configuration of the invention, the given lower voltage is changed after a given time period and it is monitored whether the active power fed into the electrical power supply network becomes larger than the given value. If this is indeed the case, then the method can once again be implemented in the manner done initially.

Further characteristics, practical applications and advantages of the invention result from the description of the embodiments given below, which are shown in the associated figures. All characteristics described or shown are the object of the invention by themselves or in any combination, regardless of the way in which they are summarized in the patent claims or their retroactive application of the claims and irrespective of their formulation in the description or representation in the figures.

Figure 1:
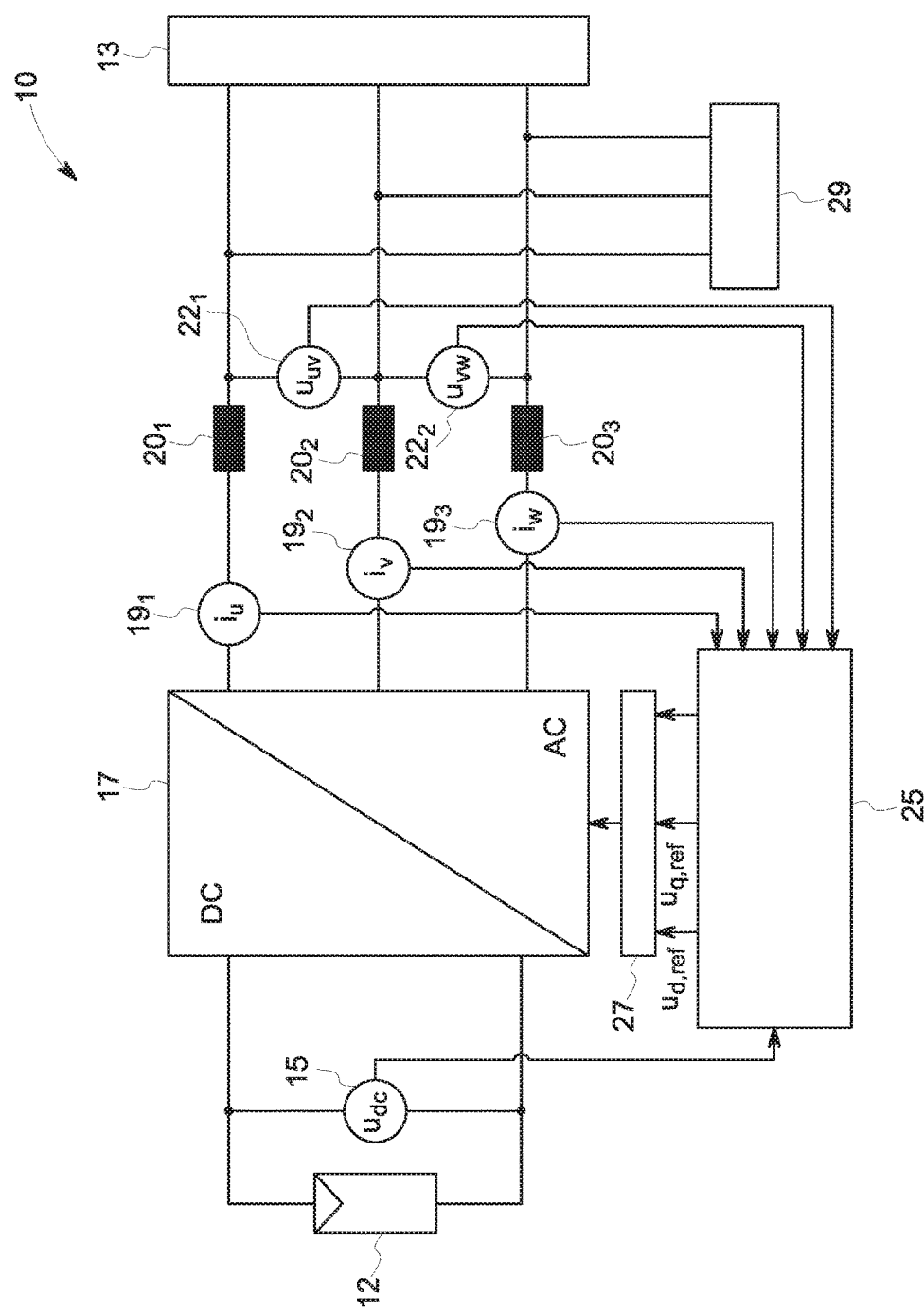
FIG. 1 shows a schematic block diagram of an embodiment of a device according to the invention for feeding electrical power into an electrical power supply network.

FIG. 1 shows a device 10 that can be used for feeding electrical power into an electrical power supply network. In this embodiment, the electrical power is exemplarily supplied by a photovoltaic generator 12 and the electrical power supply network is an example of a three-phase AC current network 13. The photovoltaic generator 12 can be a component of a solar installation used for converting solar energy into electricity.

It must be pointed out that, instead of the photovoltaic generator 12, another configuration can be provided for generating and delivering electrical power in the form of a DC voltage or DC current. It must also be mentioned that instead of the three-phase alternating current network 13, another type of electrical power supply network can also be installed.

The photovoltaic generator 12 generates an actual intermediate circuit voltage $u_{dc}$, which is measured by a voltage sensor 15 and made available as exit signal. This intermediate circuit voltage $u_{dc}$ is DC voltage. The actual intermediate circuit voltage $u_{dc}$ is applied on the entrance to an inverter 17 that has three outputs on which there are actual inverter currents $i_u$, $i_v$, $i_w$ measured in each case by three associated current sensors $19_1$, $19_2$, $19_3$ that can be built inductively, for example, and provide the corresponding output signals. Every one of the three outputs with the actual inverter currents $i_u$, $i_v$, $i_w$ has an inductivity $20_1$, $20_2$, $20_3$, and they can be, among other things, power chokes and/or power inductivities. Two additional voltage sensors $22_1$ and $22_2$, connected between the three outputs of the inverter 17, are subordinated to the inductivities $20_1$, $20_2$, $20_3$. Voltage sensor $22_1$ measures an actual line voltage $u_{uv}$ and voltage sensor $22_2$ measures an actual line voltage $u_{vw}$. Both voltage sensors $22_1$ and $22_2$ provide the corresponding output signals.

The inverter 17 can be any electrical device used for converting DC voltage to AC voltage or DC current to AC current. The inverter 17 is equipped with electrical switches, especially electronic power semi-conductor structural elements such as IGBTs (IGBT=insulated gate bipolar transistors) and/or GTO transistors (GTO=gate turn off) or similar devices. If need be, the inverter 17 has one or several capacitors connected parallel to the photovoltaic generator 12. For example, in the case of the inverter 17, it can be a two- or multi-phase NPC power converter (NPC=neutral point clamped).

A control device 25 has been provided to which all output signals from the voltage and current sensors 15, $19_1$, $19_2$, $19_3$, $22_1$ and $22_2$ are delivered. In the case of the control device 25, it can be an electronic calculator, for example, especially a personal computer. Depending on the output signals delivered, the control device 25 supplies at least an active desired inverter voltage $u_{d,\,ref}$ and a reactive desired inverter voltage $u_{q,\,ref}$. If necessary, the control device 25 also supplies additional signal variables from the output, very generally indicated as an arrow in FIG. 1, and that can be phase angles or something similar.

The active desired inverter voltage $u_{d,\,ref}$ and the reactive desired inverter voltage $u_{q,\,ref}$ apply current to a pulse pattern generator 27 that depending on the active desired inverter voltage $u_{d,\,ref}$ and the reactive desired inverter voltage $u_{q,\,ref}$ exerts an effect on the inverter 17. In particular, the pulse pattern generator 27 influences the electrical switches associated with the inverter 17 in such a way that the DC voltage present on the entrance side of the inverter 17—namely the actual intermediate circuit voltage $u_{dc}$—is converted to AC voltages or AC currents on the output side, namely to the actual inverter currents $i_u$, $i_v$ and $i_w$.

The three outputs of the inverter 17 subordinated to the inductivities $20_1$, $20_2$ and $20_3$ are linked to a network filter 29 that serves for smoothing the generated AC voltage or AC current. Afterwards, the three outputs of the inverter 17 are connected to the three-phase AC current network 13 so that the actual inverter currents $i_u$, $i_v$ and $i_w$ present in the outputs are fed into the AC current network 13.

The control device 25 has been intended for influencing the inverter 17 in such a way through the pulse pattern generator 27 that the actual inverter currents $i_u$, $i_v$ and $i_w$ and with them, the electrical power to be fed into the AC current network 13 has the desired chronological sequence. In particular, they should be alternating currents, as already mentioned.

Figure 2A:
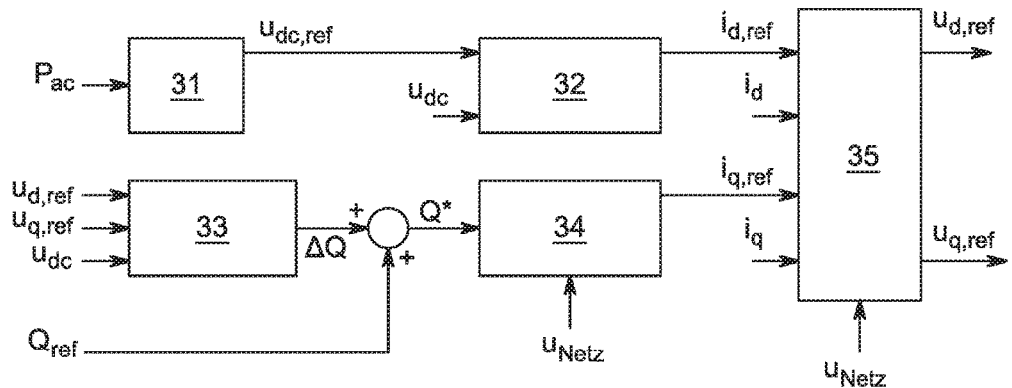
FIGS. 2a-2c show schematic block diagrams of methods for controlling the device shown in FIG. 1.
Figure 2B:
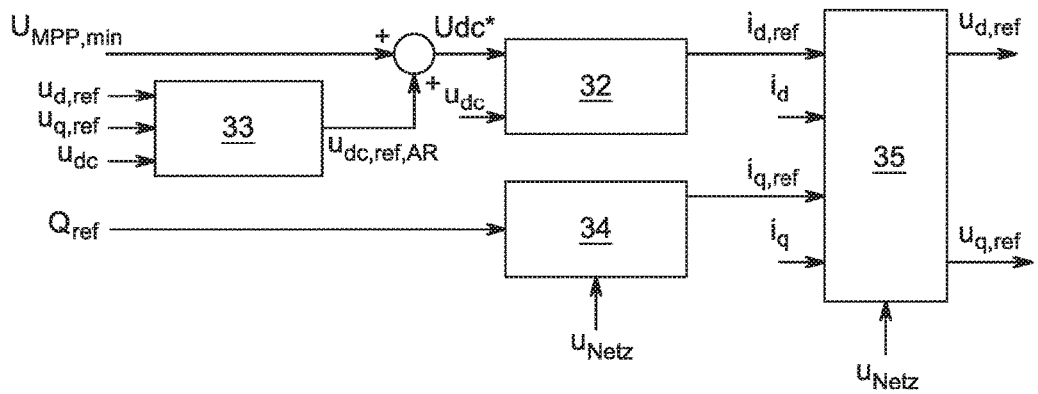
Figure 2C:
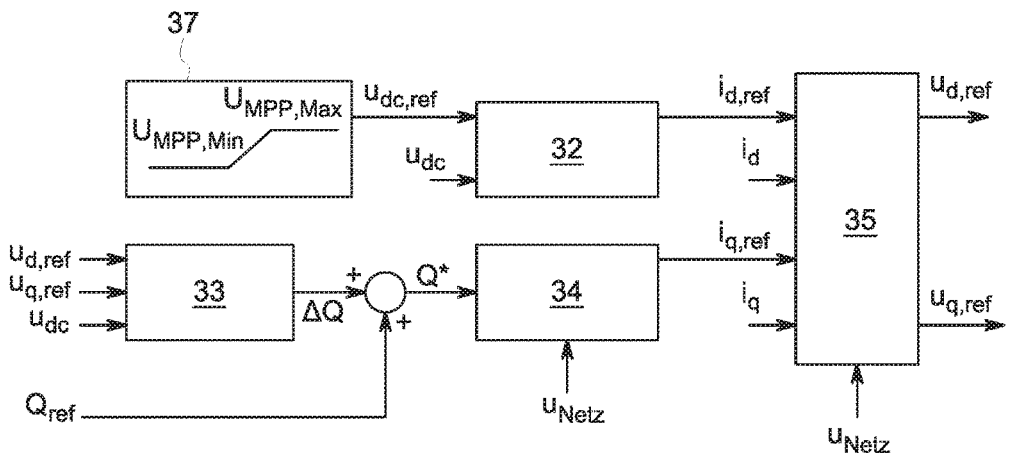

For this purpose, the control device 25 has been designed in such a way that the subsequent methods described with the help of FIGS. 2a-2c can be implemented with its help. These methods are control or regulatory methods that can be implemented by programming the control device 25 accordingly, for example. Therefore, the methods described below can be present in the form of a computer program stored in a memory.

FIG. 2a shows a method that is only implemented when the active power $P_{ac}$ that has been fed into the AC current network 13 is larger than a given value: $P_{ac} > K$. This requirement will be explained in more detail below. In order to implement this method, a so-called MPP tracker 31 (MPP=maximum power point), an intermediate circuit voltage regulator 32, a modulation regulator 33, a blind current pre-control device 34 and a current regulator 35 must be provided (alls shown in FIG. 2a).

The MPP tracker 31 is supplied with the active power $P_{ac}$ fed into the AC current network 13. The control device 25 can determine this active power $P_{ac}$, for example, from the measured actual inverter currents $i_u$, $i_v$ and $i_w$ and the actual network voltages $u_{uv}$ and $u_{vw}$. If the active power $P_{ac}$ that has been determined is larger than the value K, then the method is implemented according to FIG. 2a.

On the outlet side, the MPP tracker 31 generates an intermediate circuit desired voltage $u_{dc,\,ref}$ with which the subsequent intermediate circuit voltage regulator 32 is influenced. The MPP tracker 31 should accomplish that the active power $P_{ac}$ fed into the AC current network 13 is always at a maximum whenever possible.

For this purpose, the MPP 31 changes the intermediate circuit desired voltage $u_{dc,\,ref}$ by a small value like 5 volts, for example. In particular, the intermediate circuit desired voltage $u_{dc,\,ref}$ is increased by this small value. Then, the further course of the active power $P_{ac}$ fed into the alternating current network 13 is observed. If the active power $P_{ac}$ increases, then the changed value of the intermediate circuit desired voltage $u_{dc,\,ref}$ is maintained. However, if the active power $P_{ac}$ decreases, then there is a return to the original value of the intermediate circuit desired voltage $u_{dc,\,ref}$.

This procedure is continuously repeated to accomplish that the active power $P_{ac}$ fed into the AC power supply network 13 is always at a maximum whenever possible, as desired.

As has already been mentioned, the intermediate circuit voltage regulator 32 has been subordinated to the MPP tracker 31. The desired intermediate circuit voltage $u_{dc,\,ref}$ and the actual intermediate circuit voltage $u_{dc}$ are supplied to the intermediate circuit voltage regulator 32. Depending on this, the intermediate voltage regulator 32 generates a desired active inverter current $i_{d,\,ref}$, which is supplied to the voltage regulator 35.

In particular, the intermediate circuit voltage regulator 32 generates the desired inverter current $i_{d,\,ref}$ in such a way that the actual intermediate circuit voltage $u_{dc}$ follows the desired intermediate circuit voltage $u_{dc,\,ref}$ as quickly and precisely as possible. To achieve this, any control and/or regulatory methods can be used in the intermediate circuit voltage regulator 32.

The active and reactive desired inverter voltage $u_{d,\,ref}$ and $u_{q,\,ref}$ (generated by the current regulator 35, as will be explained below) supply the modulation regulator 33. Furthermore, the actual intermediate circuit voltage $u_{dc}$ has been applied on the modulation regulator 33. Depending on this, the modulation regulator 33 generates a reactive power adjustment value $\Delta Q$ in such a way that the relationship between a line voltage amplitude $u_{netz}$ (explained in more detail below) and the actual intermediate circuit voltage $u_{dc}$ lies within a range of "0" and "1" so the device 10 is largely controlled linearly.

The reactive power adjustment value $\Delta Q$ is additively linked to reactive power desired value $Q_{ref}$ to get a reactive power value $Q^*$. The reactive power desired value $Q_{red}$ can be given by the operator of the AC power supply network 13, for example, or determined in another way. The reactive power desired value $Q_{ref}$ furnishes that reactive power that should be fed into the AC power supply network 13 for whatever reason.

The reactive power value $Q^*$ is supplied to the reactive power pre-control device 34. Furthermore, the line voltage amplitude $u_{netz}$ (determined by the control device 25 from the actual line voltages $u_{uv}$ and $u_{vw}$) is supplied to the reactive power pre-control device 34. Depending on this, the reactive power pre-control device 34 generates a desired reactive inverter current $i_{q,\,ref}$ that is supplied to the current regulator 35.

From the measured actual inverter currents $i_u$, $i_v$ and $i_w$ (which are supplied to the current regulator 35), the control device 25 determines an active and reactive actual inverter current $i_d$ and $i_q$. Depending on the supplied active and reactive desired inverter currents $i_{d,\,ref}$ and $i_{q,\,ref}$, the supplied active and reactive actual inverter currents $i_d$ and $i_q$, plus the line voltage amplitude $U_{netz}$, the current regulator 35 generates the active and reactive desired inverter voltages $u_{d,\,ref}$ and $u_{q,\,ref}$ (already mentioned above) that are supplied to the modulation regulator 33. At the same time, the current regulator 35 generates these desired inverter voltages $u_{d,\,ref}$ and $u_{q,\,ref}$ in such a way that the actual inverter currents $i_d$ and $i_q$ follow the desired inverter currents $i_{d,\,ref}$ and $i_{q,\,ref}$ as quickly and precisely as possible. For this purpose, any control and/or regulating processes can be utilized in the current regulator 35.

As has already been explained, the active and reactive desired inverter voltage $u_{d,\,ref}$ and $u_{q,\,ref}$ is applied to the pulse pattern generator 27. The two desired inverter voltages $u_{d,\,ref}$ and $u_{q,\,ref}$ preset the influence on the electronic switches of the inverter 17 through the pulse pattern generator 27, thus influencing the actual inverter currents $i_u$, $i_v$ and $i_w$ generated by the inverter 17 and ultimately the two actual network voltages $u_{uv}$ and $u_{uw}$ too.

Figure 3:
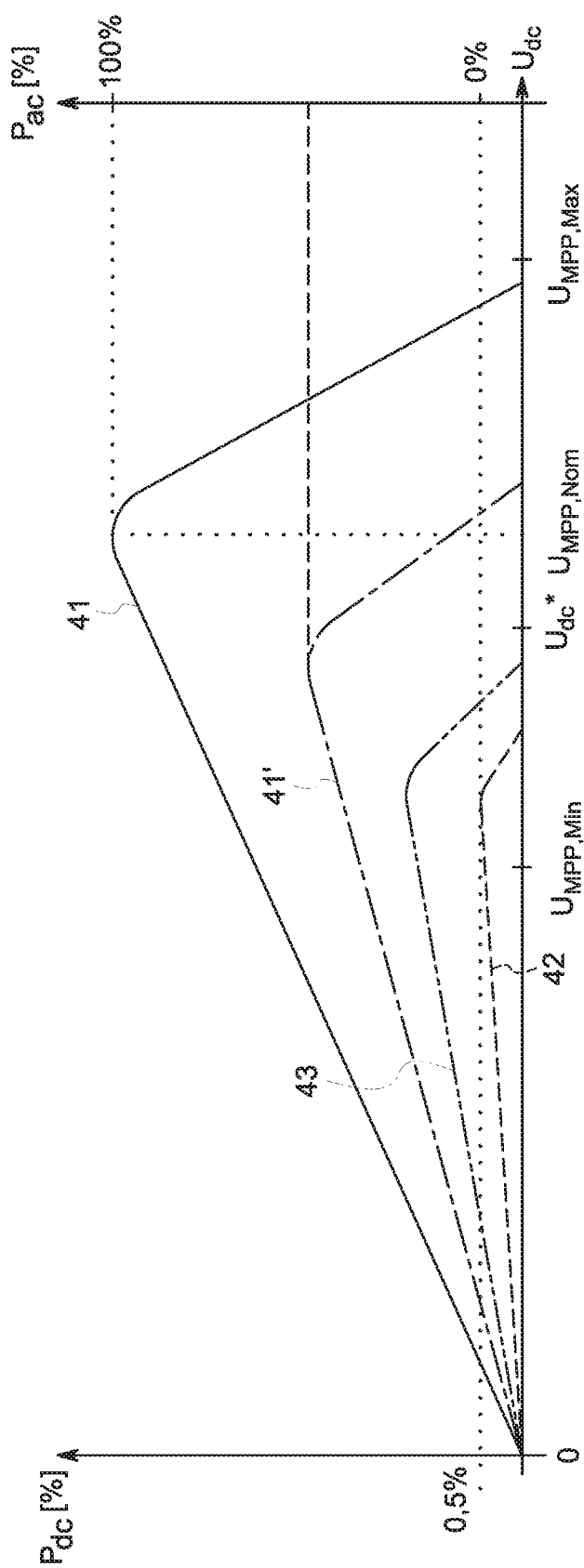
FIG. 3 shows a schematic diagram for explaining the methods shown in FIGS. 2a-2c.

The diagram of FIG. 3, for example, shows exemplary characteristic curves of the photo-voltaic generator 12. In this embodiment, it is assumed that the photovoltaic generator 12 has several photovoltaic modules suitable for converting incident sunlight to electricity. It is furthermore assumed that the photovoltaic modules are located outdoors and the temperature in the exterior is about 25 degrees C. It must be pointed out that the characteristic lines explained below do not depend solely on incident light but on the outdoor temperature mentioned above as well. In particular, the real output described below can be lower with higher outdoor temperatures. This temperature dependence, however, is not considered in more detail below.

In FIG. 3, the intermediate circuit actual voltage $u_{dc}$ has been plotted on the x-coordinate. The active power $P_{ac}$ fed into the AC current network 13, on the one hand, and a power $P_{dc}$ put out by the photovoltaic generator 12, on the other hand, have been plotted on the y-coordinate. Both powers have been indicated in values expressed as percentages. Between the two powers there is essentially the following relationship: $P_{ac}=P_{dc}-V$, where "V" is the power dissipation of the photovoltaic generator 12 and/or of the inverter 17.

If incident light is strong, the characteristic line 41 in FIG. 3 is relevant. In this case, the active power $P_{ac}$ fed into the AC current network 13 is larger than the value of K and as a result of that the method according to FIG. 2a is implemented. In this embodiment, it is assumed that in the method according to FIG. 2a, the intermediate circuit desired voltage $u_{dc, ref}$ supplied by the MPP tracker 31 can have essentially values between a lower voltage $U_{MPP, min}$ and a higher voltage $U_{MPP, max}$.

If now, under strong incident light and with an outdoor temperature of 25 degrees C., about 100% of the active power $P_{ac}$ (i.e. ultimately the rated power of the photovoltaic generator 12 is fed into the AC current network 13), then the intermediate circuit desired voltage $U_{dc, ref}$ has a value of $U_{MPP, nom}$. This value of $U_{MPP, nom}$ represents the operating point with which the inverter 17 is therefore operated when the rated power of the photovoltaic generator 12 is fed into the AC current network 13.

When, for example, the active power $P_{ac}$ fed into the AC current network 13 becomes smaller because incident light is lower, the characteristic line 41 moves towards a characteristic line 41'. As long as in all of this, the active power $P_{ac}$ remains larger than the given value of K, the method explained with the help of FIG. 2a continues to be implemented. In this case, the operating point of the inverter 17 also moves according to the arrow shown, towards the lower voltage $U_{MPP, min}$.

If, however, the active power $P_{ac}$ fed into the AC current network 13 becomes equal to, or smaller than, the value of K owing to even lower incident light, then the method according to FIG. 2a is deactivated and a method according to FIG. 2b is implemented instead.

The value of K can be a value that is only slightly higher than zero. For example, the value of K can have the magnitude of about 1% of the active power $P_{ac}$.

It is likewise also possible to provide the value of K by means of the power $P_{ac}$ supplied by the photovoltaic generator 12. Between the active power $P_{ac}$, the power $P_{dc}$ and the power dissipation V, there is essentially the relationship: $P_{ac}=P_{dc}-V$ mentioned above. The value of K can now be given as the power dissipation V. In the embodiment of FIG. 3, the power dissipation V is exemplarily given as 0.5%.

When the active power $P_{ac}$ fed into the AC current network 13 is smaller or larger than the value of K, then it corresponds to the characteristic line 42 of FIG. 3. The active power $P_{ac}$ is in this case almost zero or equal to zero and the power $P_{dc}$ put out by the photovoltaic generator 12 is approximately 0.5% in this embodiment. The resulting difference largely corresponds to the power dissipation V mentioned above, as already explained.

As has also been explained above, the control device 25 can determine the active power $P_{ac}$ fed into the AC current network 13. If the control device 25 now detects that the active power $P_{ac}$ fed into the AC current network 13 is smaller than or equal to the value of K, then the control device 25 switches from the method according to the FIG. 2a to the method according to FIG. 2b.

Contrary to FIG. 2a, there is either no MPP tracker 31 in the method according to FIG. 2b or the MPP tracker has been deactivated. Instead, the modulation regulator 33 in FIG. 2b generates an AR intermediate circuit desired value $U_{dc, ref, AR}$ that is additively linked up to an intermediate circuit desired value $U_{dc}^*$. In this, the AR intermediate circuit desired value $U_{dc, ref, AR}$ is determined by the modulation regulator 33 depending on the active and reactive inverter desired voltage $u_{d, ref}$ and $u_{q, ref}$ as well as on the intermediate circuit actual voltage $u_{dc}$.

The value of $U_{dc}^*$ is supplied to the intermediate circuit voltage regulator 32. Furthermore, the given reactive power desired value $Q_{ref}$ is supplied directly to the reactive power pre-control device 34 in FIG. 2b. Here, the value of $U_{dc}^*$ supplied to the intermediate circuit voltage regulator 32 represents the operating point for the inverter 17 in accordance with the characteristic line 42.

Therefore, the way the intermediate circuit voltage regulator 32, the reactive power pre-control device 34 and the current regulator 45 function corresponds to the method according to FIG. 2a already explained above.

If, as explained above, the method shown in FIG. 2a is deactivated and the method according to FIG. 2b is implemented instead, then a given time period is started essentially at the same time as the transition to the method according to FIG. 2b takes place. After this time period elapses, the method according to FIG. 2b is deactivated and a method according to FIG. 2c is implemented instead.

The method according to FIG. 2c is essentially the same as the method according to FIG. 2a. As a matter of fact, the same reference symbols are employed in FIG. 2c and reference is made to the previous explanations given for FIG. 2a.

Contrary to FIG. 2a, the method followed according to FIG. 2c employs no MPP tracker 31 or this MPP tracker 31 has been deactivated. Instead, the intermediate circuit desired value $U_{dc, ref}$ is continuously changed from the lower voltage $U_{MPP, min}$ and the higher voltage $U_{MPP, max}$ in the method according to FIG. 2c. A block 37 has been provided for this in FIG. 2c. In accordance with this block 37, the change of the intermediate circuit desired voltage $U_{dc, ref}$ is executed linearly or ramp-like in this embodiment.

By the way, the setup and operating principle of the method of FIG. 2c is identical to that of FIG. 2a.

In the method according to FIG. 2c, the control device 25 monitors whether the active power $P_{ac}$ fed into the AC current network 13 becomes once again larger than the value of K while the intermediate circuit desired voltage $u_{dc, ref}$ changes. If this is not the case, then once an additional given time period has elapsed, the intermediate circuit desired voltage $u_{dc,\ ref}$ (explained above) is changed once more by means of the block 37. In other words, the intermediate circuit desired voltage $u_{dc,\ ref}$ is run once again in the form of a ramp. While this occurs, the control device monitors whether the active power $P_{ac}$ fed into the AC current network 13 becomes larger than the value of K once again while the intermediate circuit desired voltage $u_{dc,\ ref}$ is being changed. Depending on the result of this monitoring, the approach taken above can be repeated once more and continuously if necessary.

The time periods given (mentioned above) can have any values, such as 30 minutes or the like, for example. However, the time periods can also be zero, if applicable.

If the control device 25 at some point in time now detects that the active power $P_{ac}$ fed into the AC current network 13 has once again become larger than the value of K while the intermediate circuit desired voltage $u_{dc,\ ref}$ is being changed, then this means that the characteristic line 42 is no longer relevant and instead the characteristic line 43 will now be the relevant one, for example. In this case, the control device 25 switches from the method of FIG. 2c to the method according to FIG. 2a that was already explained above.

Afterwards, the inverter 17 is once more influenced by means of the method of FIG. 2a. Depending on the active power $P_{ac}$ observed (which is fed into the AC current network 13), the methods according to FIGS. 2b and 2c can be implemented, as explained above.

The invention claimed is:

1. Method for feeding electrical power into an electrical power supply network, whereby a configuration for supplying electrical power in the form of DC voltage is connected to an electrical supply network by means of an inverter, and whereby a maximum power point tracker is provided for influencing the inverter, characterized in that an intermediate circuit desired voltage ($u_{dc,\ ref}$) is determined from the maximum power point tracker, that a modulation regulator is provided, from which a given reactive power desired value $Q_{ref}$ is changed to a reactive power value ($Q^*$), and that the inverter is influenced by the intermediate circuit desired voltage ($u_{dc,\ ref}$) and the reactive power value ($Q^*$) when an active power ($P_{ac}$) fed into the power supply network is larger than a given value (K), and when the active power ($P_{ac}$) fed into the power supply network is smaller than or equal to the given value (K), a given lower voltage ($U_{MPPm,\ min}$) is changed to an intermediate circuit desired value ($U_{dc}^*$) and the inverter is influenced by the intermediate circuit desired value ($U_{dc}^*$) and a given reactive power desired value ($Q_{ref}$).

2. Method according to claim 1, whereby an inverter desired current ($i_{d,\ ref},\ i_{q,\ ref}$) and/or an inverter desired Voltage ($u_{d,\ ref},\ u_{q,\ ref}$) are determined from the intermediate circuit desired voltage ($u_{dc,\ ref}$) and the reactive power value ($Q^*$).

3. Method according to claim 2, whereby a reactive power adjustment value ($\Delta Q$) is determined from the modulation regulator depending on the inverter desired current ($i_{d,\ ref},\ i_{q,\ ref}$) and/or on the inverter desired voltage ($u_{d,\ ref},\ u_{q,\ ref}$), and whereby the reactive power adjustment value ($\Delta Q$) is linked up to the reactive power value ($Q^*$) with the reactive power desired value $Q_{ref}$.

4. Method according to claim 1, whereby a reactive power pre-control device is provided, from which a reactive inverter desired current ($i_{q,\ ref}$) is determined from the power value ($Q^*$).

5. Method according to claim 4, whereby one/the current regulator is provided, from which the reactive inverter desired current ($i_{q,\ ref}$) is regulated on a reactive inverter actual current ($i_q$).

6. Method according to claim 1, whereby an intermediate circuit desired voltage ($U_{dc,\ ref,\ AR}$) is determined from the modulation regulator depending on an inverter desired current ($i_{d,\ ref},\ i_{q,\ ref}$) and/or an inverter desired voltage ($u_{d,\ ref},\ u_{q,\ ref}$), and whereby the intermediate circuit desired voltage ($U_{dc,\ ref,\ AR}$) is linked to the intermediate circuit desired value ($U_{dc}^*$) with the lower voltage ($U_{MPP,\ min}$).

7. Method according to claim 1, whereby after a time period that can be set, the lower voltage ($U_{MPP,\ min}$) that can be set is changed, and whereby it is monitored whether the active power ($P_{ac}$) being fed into the power supply network becomes larger than the given value (K).

8. Method according to claim 7, whereby, when the power ($P_{ac}$) being fed into the power supply network becomes larger than the given value (K), the intermediate circuit desired voltage ($u_{dc,\ ref}$) is determined once again by the MPP tracker and the given reactive power desired value ($Q_{ref}$) is changed once again to the reactive power value ($Q^*$) by the modulation regulator and the inverter is once again influenced by the intermediate circuit desired voltage ($u_{dc,\ ref}$) and the reactive power value ($Q^*$).

9. Device for feeding electrical power into a power supply network, with a configuration for supplying electrical power in the form of DC voltage that is connected to a power supply network through an inverter and to a control device that is coupled to the inverter, whereby a maximum power point tracker is provided for influencing the inverter, characterized in that an intermediate circuit desired voltage ($u_{dc,\ ref}$) is determined from the maximum power point tracker, that a modulation regulator is provided, from which a given reactive power desired value $Q_{ref}$ is changed to a reactive power value ($Q^*$), and that the inverter is influenced by the intermediate circuit desired voltage ($u_{dc,\ ref}$) and the reactive power value ($Q^*$) when an active power ($P_{ac}$) fed into the power supply network is larger than a given value (K), and when the active power ($P_{ac}$) fed into the power supply network is smaller than or equal to the given value (K), a given lower voltage ($U_{MPPm,\ min}$) is changed to an intermediate circuit desired value ($U_{dc}^*$) and the inverter is influenced by the intermediate circuit desired value ($U_{dc}^*$) and a given reactive power desired value ($Q_{ref}$).

10. Device according to claim 9, whereby the configuration for supplying electrical power in the form of a direct voltage is a photovoltaic generator.

11. Device according to claim 9, whereby the inverter has electrical switches, and whereby the control device acts on the switches of the inverter through a pulse pattern generator.

* * * * *